Patented Sept. 11, 1934

1,972,888

UNITED STATES PATENT OFFICE 1,972,888

KEENE'S CEMENT

Waldemar C. Hansen, Westfield, N. J., assignor to American Cyanamid Company, New York, N. Y., a corporation of Maine No Drawing. Application January 19, 1932, Serial No. 587,605

17 Claims. (Cl. 106—34)

The present invention relates to the manufacture of Keene's cement and is more specifically concerned with the production of that material from by-product gypsum, which in turn is the result of the reaction between an impure grade of phosphate rock and sulphuric acid, the rock initially carrying iron compounds as an impurity or where iron has been picked up during the treatment by reason of the acidulous character of the treated materials.

The manufacture of Keene's cement from rock gypsum constitutes a very old art and the usual practice has been to calcine this hydrated calcium sulphate to produce the anhydrous salt, which when mixed with suitable accelerators such as alum and gauged with water, sets into a dense, strong product.

The present invention, therefore, relates to the production of a Keene's cement of the above type which, however, uses as its initial calcium sulphate, the fully hydrated salt or the calcium sulphate hemihydrate resulting from the reaction between phosphate rock and sulphuric acid, and is a by-product from this reaction.

Large quantities of by-product gypsum are produced as a result of the above reaction in the manufacture of phosphoric acid, utilizing the poorer grades of phosphate rock which carry iron as an impurity. Some of this iron carries through the reaction and makes its way into the by-product gypsum, with the result that when this gypsum is finally subjected to the desired calcination temperature, the iron finishes up as a red oxide which gives a decidedly pink or reddish tinge to the Keene's cement prepared therefrom. While this color in some instances is not objectionable, yet as the principal use for Keene's cement is under such circumstances where a white finish is desired, some means must be provided for eliminating this undesirable color.

It is the principal object of the present invention to produce a white or light colored Keene's cement from such materials in such a manner that either the pink or reddish tinge due to iron oxide is entirely eliminated or at least minimized to such an extent that it is no longer objectionable.

It has been found through extensive experimentation that if by-product gypsum from the above source is calcined at temperatures approximating 1000° C., this pink or reddish color will develop. This undesirable result occurs even when temperatures as low as 600° C. are used in the calcination operation. It has been discovered, however, that a light colored product may be secured by calcination even at these higher temperatures where the iron impurity is converted into a substantially colorless iron salt. This may be accomplished by many varying procedures.

In its broadest aspect, the invention contemplates the calcining of by-product gypsum at a very high temperature so as to produce a dense product, for density in this material is a desirable characteristic, in combination with the conversion of the iron as an impurity into a substantially colorless iron salt as for instance ferric sulphate. One such method of accomplishing this result is to mix the hydrated calcium sulphate, that is, either the fully hydrated salt or the hemihydrate with from 1% to 3% of a volatile, decomposable reagent which under the action of heat will form a substantially colorless salt with iron and which will produce no unduly colored decomposition products, and then calcine this mixture at temperatures between 600° and 750° C. for from thirty minutes to six hours. This temperature has the effect of causing the decomposition of the reagent and conversion of the iron to produce a substantially colorless compound and which is not further decomposed when the calcination temperature is maintained below 800° C. On the other hand, if a temperature higher than 800° C. is used in this procedure, a reconversion occurs and the red iron oxide is produced, with consequent coloring of the cement, which is undesirable. The maintenance of the calcination temperatures at from 600° C. to 750° C. for the specified time gives the requisite dehydration and produces a satisfactorily dense product. This product when mixed with an accelerator such as 2% potassium alum or preferably a mixture of 1% aluminum sulphate and 1% potassium sulphate, gives when gauged with the requisite amount of water, satisfactory set and a product comparable in all respects to Keene's cement prepared from rock gypsum.

The use of from 1% to 3% of the following substances as above set forth have been found to give satisfactory results: Ammonium sulphate, ammonium arsenate, ammonium phosphate, phosphoric acid, sulphuric acid.

Another satisfactory procedure consists in the calcination of the dihydrate or hemihydrate of calcium sulphate at temperatures approximating 1000° C. until the anhydrous salt has been formed. Heating at this point is then discontinued and the hot calcined material thoroughly mixed with from 1% to 3% of the decomposable reagent. In this mixing process, the excess heat is immediately dissipated and the mixture cooled below the point where the colorless iron salt thus formed will be converted to the red iron oxide. Such procedure produces a dry powder which has a satisfactory light color and which may be converted into Keene's cement by admixture with an accelerator and gauged with water.

It is to be understood, of course, that in the calcination of by-product gypsum containing iron as an impurity, if temperatures in excess of 800° C. are to be used, admixture with the reagent must be postponed until after the calcination is complete for otherwise the reagent will be decomposed and lost and the product will be pink or reddish due to the oxidized iron.

Any desired type of apparatus may be used for the calcination and mixing operation but I have found machines of the sintering type to be particularly applicable. These machines are well-known and consist of a perforated grate movable beneath heating means such as a flame or the like, with the provision of vacuum or blower means for carrying the heat through the bed of material being treated on the grate. These machines are well-known and hence illustration thereof is not thought necessary.

This invention is not dependent upon the source of the iron impurity being impure phosphate rock, for in many cases it has been found that this impurity is picked up during the process due to the extremely acidic nature of the reactants and their corrosive action upon the equipment. At any rate, in many processes producing by-product gypsum, iron occurs as an impurity in this material and the invention is, therefore, concerned with the treatment of such material whatever the source of iron, in such a manner as to avoid the production of red iron oxide in the final product.

The by-product gypsum as separated from the phosphoric acid produced in the initial reaction, contains some residual phosphoric and sulphuric acids. Where the higher temperature of 1000° C. is used in the final calcination, no difficulty is experienced by reason of this residual acid, for the high temperature effectively eliminates the same. When operating at lower temperatures, however, it may be found desirable in some instances to eliminate this acidity as by neutralization or by washing. However, under ordinary circumstances, this residual acidity has not been found to be detrimental to the final product.

While the invention has been described with reference to a particular material and consists of certain specified steps, yet obviously the invention is not to be limited strictly thereto but is to be construed broadly to cover those equivalents fairly within the scope of the claims.

I claim:

1. A method of manufacturing a light colored Keene's cement from a calcium sulphate containing iron as an impurity, which comprises producing anhydrous calcium sulphate through calcination, and forming a substantially colorless iron salt therein by reaction between the iron compound and a sulphate.

2. A method of manufacturing a light colored Keene's cement from a hydrated calcium sulphate containing iron as an impurity, which comprises admixing the hydrated calcium sulphate with a decomposable sulphate and producing anhydrous calcium sulphate by calcining the mixture to dehydration at temperatures not greater than 750° C.

3. A method of manufacturing a light colored Keene's cement from a hydrated calcium sulphate containing iron as an impurity, which comprises admixing the hydrated calcium sulphate with ammonium sulphate and calcining the mixture to dehydration at temperatures not greater than 750° C.

4. A method of manufacturing a light colored Keene's cement from a hydrated calcium sulphate containing iron as an impurity, which comprises admixing the hydrated calcium sulphate with from 1% to 3% ammonium sulphate and calcining the mixture to dehydration at temperatures not greater than 750° C.

5. A method of manufacturing a light colored Keene's cement from a hydrated calcium sulphate containing iron as an impurity, which comprises admixing the hydrated calcium sulphate with sulphuric acid and producing anhydrous calcium sulphate by calcining the mixture to dehydration at temperatures not exceeding 750° C.

6. A method of manufacturing a light colored Keene's cement from a hydrated calcium sulphate containing iron as an impurity, which comprises admixing the hydrated calcium sulphate with from 1% to 3% sulphuric acid and producing anhydrous calcium sulphate by calcining the mixture to dehydration at temperatures not exceeding 750° C.

7. A method of manufacturing a light colored Keene's cement from a hydrated calcium sulphate containing iron as an impurity, which comprises admixing the hydrated calcium sulphate with a decomposable sulphate and producing anhydrous calcium sulphate by calcining the mixture to dehydration at temperatures not greater than 750° C. for from thirty minutes to six hours.

8. A dry product adapted to be gauged with water to produce a Keene's cement, comprising anhydrous calcium sulphate, a lesser amount of ferric sulphate and an accelerator.

9. A method of manufacturing a light colored Keene's cement comprising digesting an inferior grade of phosphate rock containing iron as an impurity, with sulphuric acid, separating the precipitated hydrated calcium sulphate formed as a result of the reaction from the resultant phosphoric acid, mixing the same with a decomposable sulphate, and producing anhydrous calcium sulphate by calcining the mixture at from 600° C. to 750° C.

10. A Keene's cement comprising anhydrous calcium sulphate resulting from the reaction between phosphate rock containing an iron impurity, and sulphuric acid, the iron impurities in said cement being present as ferric sulphate, and an accelerator.

11. A method of manufacturing a light colored Keene's cement from a hydrated calcium sulphate containing iron as an impurity, which comprises producing anhydrous calcium sulphate through calcination and then forming a substantially colorless iron salt therein by reaction between the iron compound and a decomposable sulphate.

12. A method of manufacturing a light colored Keene's cement from a hydrated calcium sulphate containing iron as an impurity, which comprises producing anhydrous calcium sulphate through calcination and then forming a substantially colorless iron salt therein by reaction between the iron compound and ammonium sulphate.

13. A method of manufacturing a light colored Keene's cement from a hydrated calcium sulphate containing iron as an impurity, which comprises producing anhydrous calcium sulphate through calcination at substantially 1000° C., and then admixing with the hot calcine, a decomposable sulphate.

14. A method of manufacturing a light colored Keene's cement from a hydrated calcium sulphate containing iron as an impurity, which comprises producing anhydrous calcium sulphate through calcination at substantially 1000° C., and then admixing with the hot calcine, ammonium sulphate.

15. A method of manufacturing a light colored Keene's cement from a hydrated calcium sulphate containing iron as an impurity, which comprises producing anhydrous calcium sulphate through calcination at substantially 1000° C., and then admixing with the hot calcine, from 1% to 3% ammonium sulphate.

16. A method of manufacturing a light colored Keene's cement from a hydrated calcium sulphate containing iron as an impurity, which comprises producing anhydrous calcium sulphate through calcination at substantially 1000° C., and then admixing with the hot calcine, sulphuric acid.

17. A method of manufacturing a light colored Keene's cement from a hydrated calcium sulphate containing iron as an impurity, which comprises producing anhydrous calcium sulphate through calcination at substantially 1000° C., and then admixing with the hot calcine, from 1% to 3% sulphuric acid.

WALDEMAR C. HANSEN.